United States Patent
Strong et al.

(10) Patent No.: US 7,388,522 B2
(45) Date of Patent: Jun. 17, 2008

(54) SEQUENTIALLY DECODED LOW DENSITY PARITY CODING (LDPC) FORWARD ERROR CORRECTION (FEC) IN ORTHOGONAL FREQUENCY DIVISION MODULATION (OFDM) SYSTEMS

(75) Inventors: Peter N. Strong, Newton Abbot (GB); Nigel King, South Brent (GB)

(73) Assignee: Motorola, Inc., Schaumburg, IL (US)

(*) Notice: Subject to any disclaimer, the term of this patent is extended or adjusted under 35 U.S.C. 154(b) by 0 days.

(21) Appl. No.: 11/625,857

(22) Filed: Jan. 23, 2007

(65) Prior Publication Data

US 2007/0171102 A1    Jul. 26, 2007

Related U.S. Application Data

(60) Provisional application No. 60/762,400, filed on Jan. 26, 2006.

(51) Int. Cl.
*H03M 5/02* (2006.01)

(52) U.S. Cl. ........................ 341/56; 714/752

(58) Field of Classification Search ............. 341/56; 714/755, 761, 752
See application file for complete search history.

(56) References Cited

U.S. PATENT DOCUMENTS 5,666,370 A * 9/1997 Ganesan et al. ............ 714/752

* cited by examiner

*Primary Examiner*—Rexford Barnie
*Assistant Examiner*—Joseph Lauture
(74) *Attorney, Agent, or Firm*—Lalita W. Pace; Anthony P. Curtis

(57) ABSTRACT

A method is provided for implementing a coding and adaptive modulation scheme for application to a point-to-point orthogonal frequency division multiplexed radio communications link. The method determines estimates of the likelihood of the two least significant bits of the digital representation of an input amplitude being a predetermined logical level. The likelihood estimates are input to a Forward Error Correction decoder, which produces a decision as to the state of the bits taking into account previous samples. Once the decision has been made, it is known what the ideal input amplitude would have been in the absence of noise and distortion, on the assumption that the decision was correct, and hence the contribution due to noise and distortion can be estimated. This knowledge can be used to assist the decoding of the most significant bits.

8 Claims, 7 Drawing Sheets

BLOCK DIAGRAM OF DECODER IN 8 PAM MODE

BLOCK DIAGRAM OF DECODER IN 16 PAM MODE

BLOCK DIAGRAM OF DECODER IN 8 PAM MODE

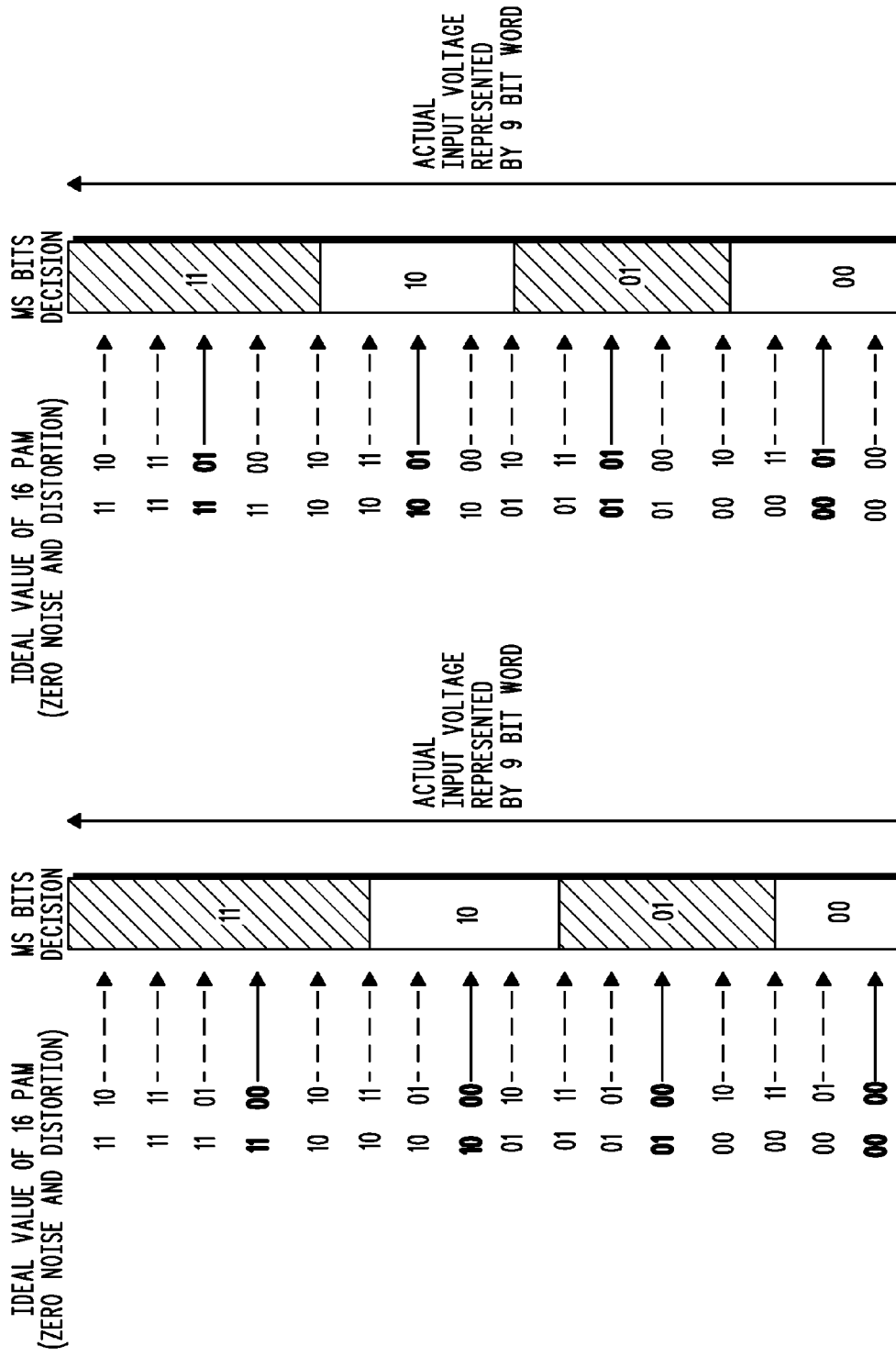

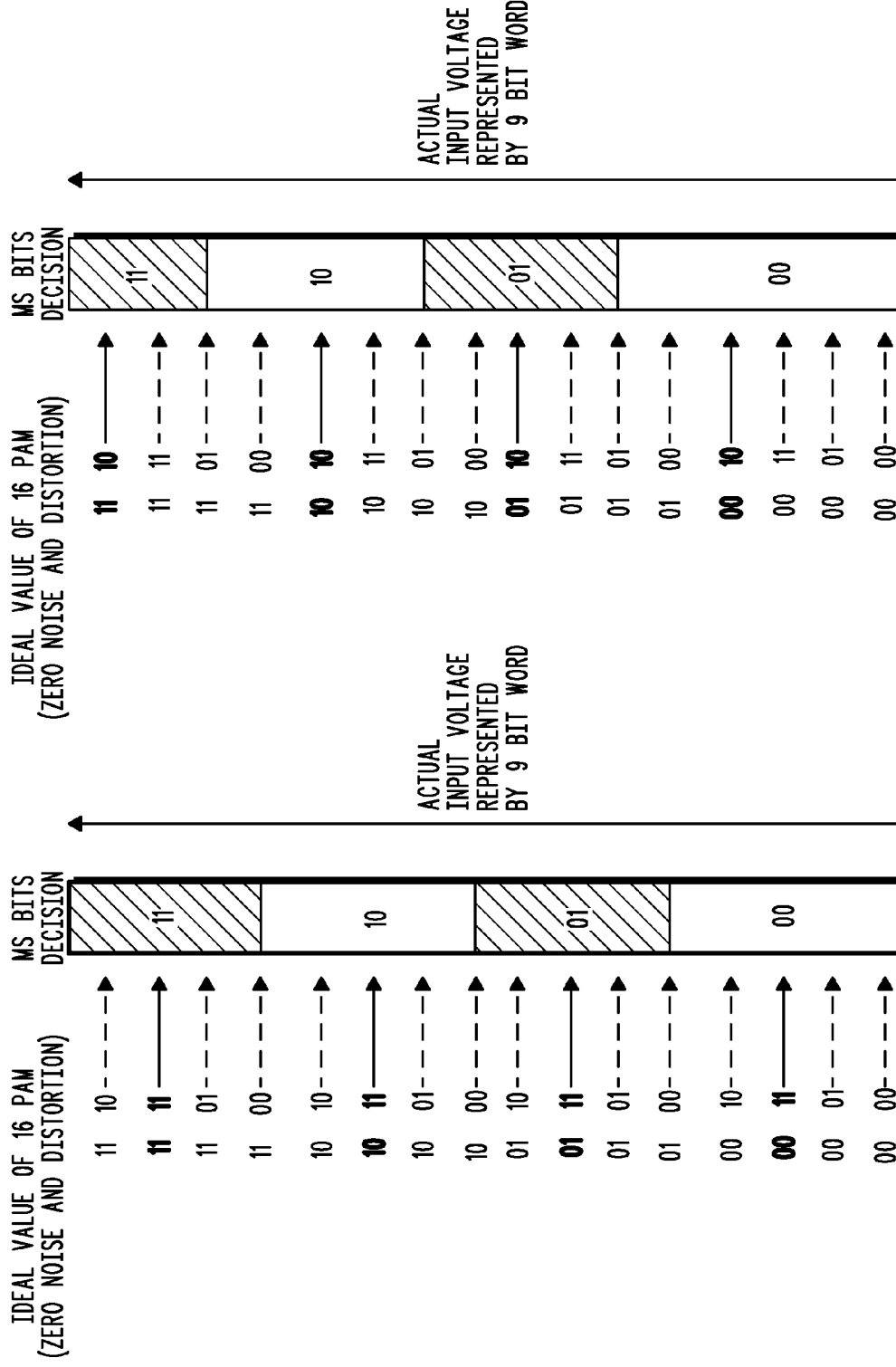

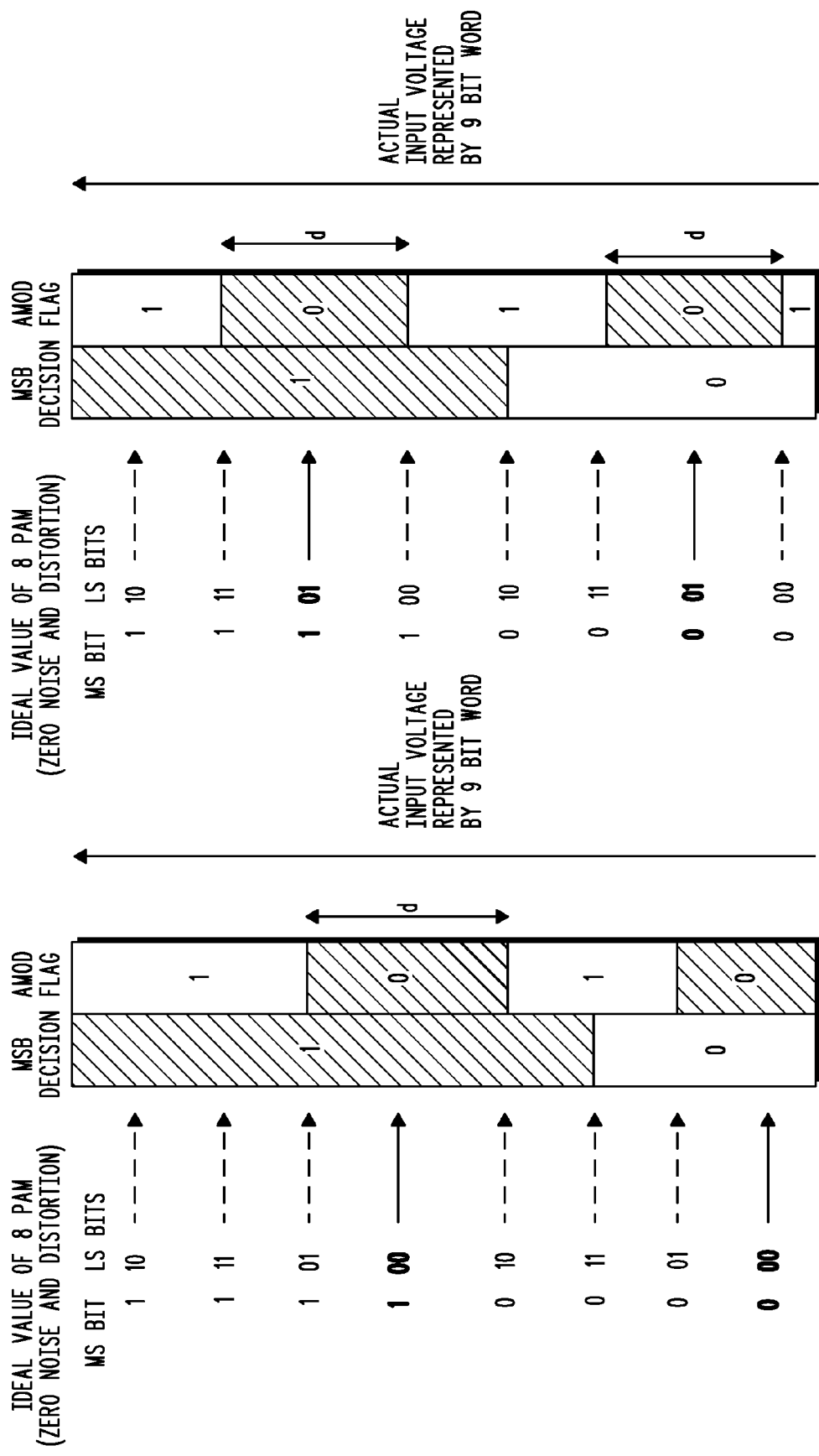

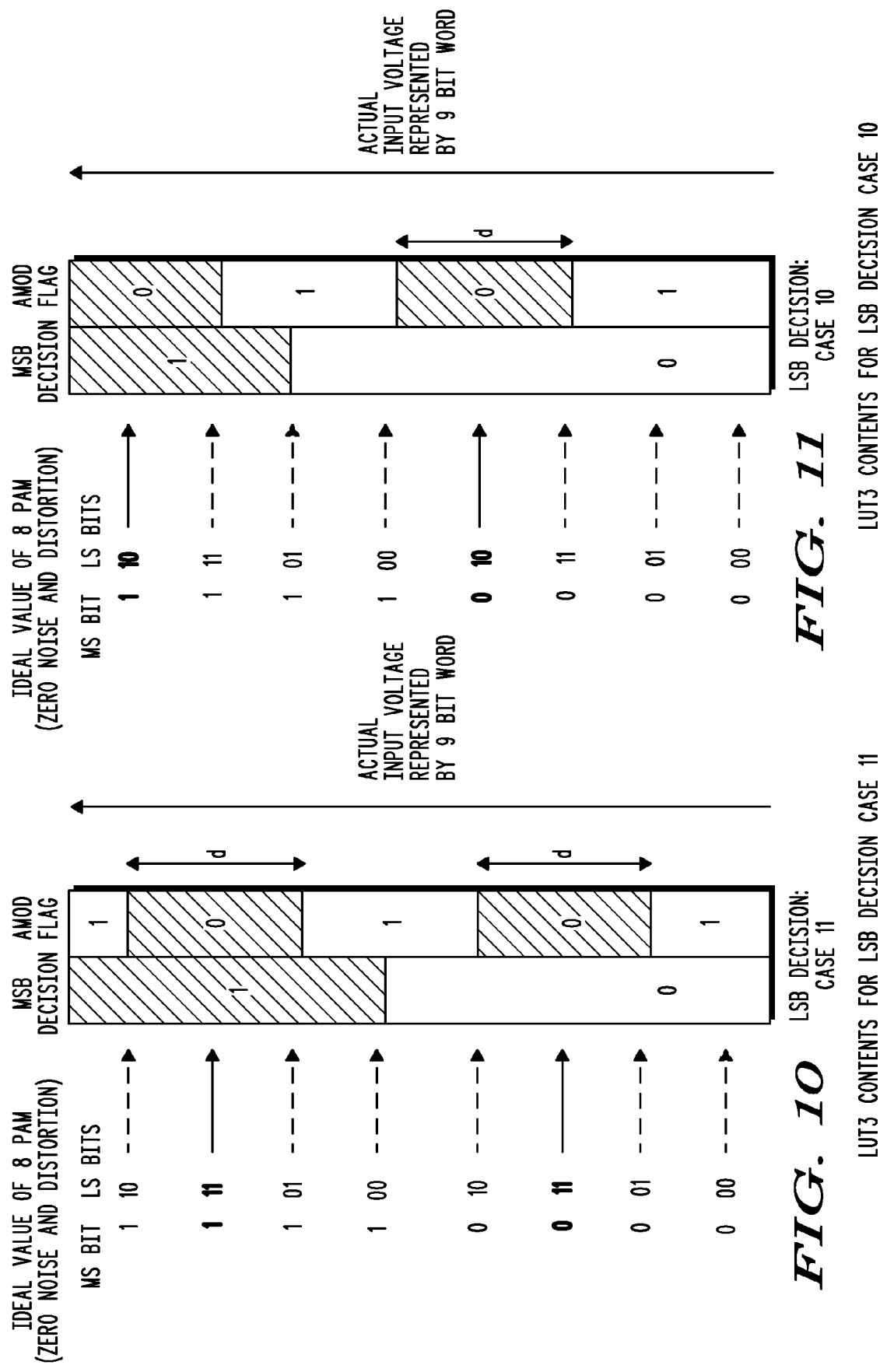

SEQUENTIALLY DECODED LOW DENSITY PARITY CODING (LDPC) FORWARD ERROR CORRECTION (FEC) IN ORTHOGONAL FREQUENCY DIVISION MODULATION (OFDM) SYSTEMS

FIELD OF THE INVENTION

The present invention relates to a method and apparatus for implementing a coding and adaptive modulation scheme for application to a point-to-point orthogonal frequency division multiplexed radio communications link and a system incorporating the same.

BACKGROUND OF THE INVENTION

A point to point radio link will typically be used to transmit data between two stations, which may be several kilometres apart. At each station there will typically be a mast to which antennas are fixed for transmission and reception, and the height, orientation and type of antenna is chosen to minimise the signal loss in the link within practical constraints. However, atmospheric ducting effects and obstructions to the link can cause a loss of signal in some circumstances. It is beneficial to employ error correction coding, which will considerably improve the tolerance of the system to signal loss.

Typically error correction coding may consist of serially concatenated convolutional and Reed-Solomon codes. Alternatively, a method known as multilevel coding may be used, which uses a different rate of code according to the significance of the bit being protected, where the least significant bits are given more powerful protection than the more significant bits. This type of code has a lower requirement for signal to noise ratio than serially concatenated convolutional and Reed-Solomon codes when the noise has white Gaussian statistics. However, the implementation of the coding is typically complex and the latency of the resulting data link may be undesirably high. An example of multilevel coding is sequentially decoded low density parity coding.

The type of modulation employed on the link can be altered adaptively to maximise the capacity of the link given the signal to noise ratio. Generally, more spectrally efficient modulation formats require a higher signal to noise ratio to operate at an error rate which is within the error correction capabilities of the coding employed. This modulation type may be chosen by a measure of signal to noise ratio, averaged over an appropriate period of time. However, generally the selection of the appropriate modulation type is inefficient due to the need to err on the side of caution when predicting whether a more spectrally efficient scheme could be employed.

BRIEF DESCRIPTION OF THE DRAWINGS

The invention will be more fully understood with reference to the following Detailed Description of the Invention in conjunction with the drawings of which:

FIG. 3 represents the contents of LUT1 referred to in FIG. 1 for LSB Decision Case 00

FIG. 4 represents the contents of LUT1 referred to in FIG. 1 for LSB Decision Case 01;

FIG. 5 represents the contents of LUT1 referred to in FIG. 1 for LSB Decision Case 11;

FIG. 6 represents the contents of LUT1 referred to in FIG. 1 for LSB Decision Case 10;

FIG. 8 represents the contents of LUT3 referred to in FIG. 2 for LSB Decision Case 00;

FIG. 9 represents the contents of LUT3 referred to in FIG. 2 for LSB Decision Case 01;

FIG. 10 represents the contents of LUT3 referred to in FIG. 2 for LSB Decision Case 11;

FIG. 11 represents the contents of LUT3 referred to in FIG. 2 for LSB Decision Case 10.

DETAILED DESCRIPTION OF THE INVENTION

Figure 1:
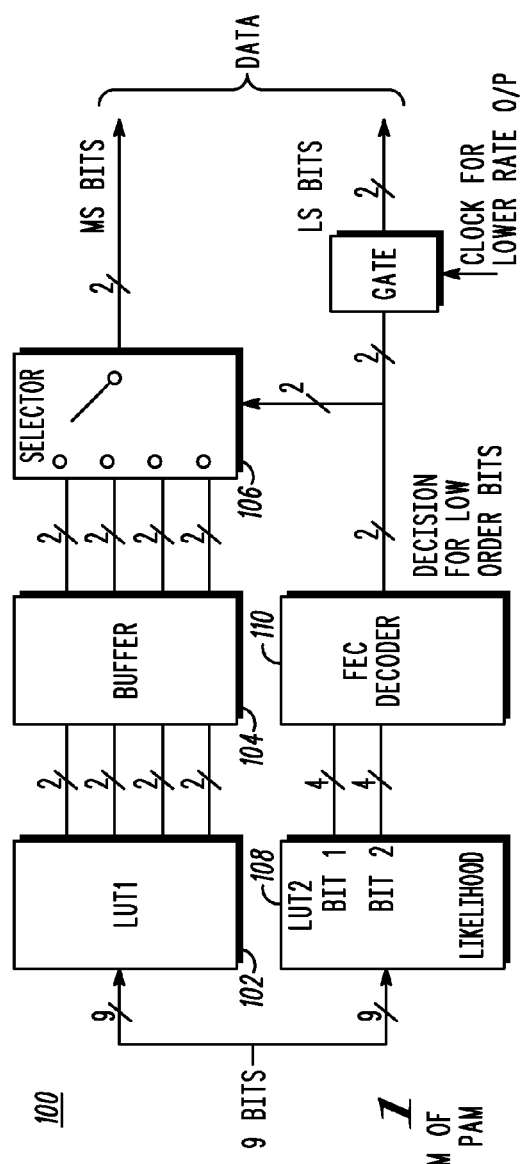
FIG. 1 shows the data flow through the decoder operating in 16 PAM mode.

The disclosed system seeks to provide an improved technique for implementing multi-level coding in a manner which simplifies the implementation with only a small loss in performance in terms of required signal to noise ratio for a given error rate. In addition, the scheme reduces latency compared with conventional sequentially decoded low density parity coded schemes.

The disclosed system also seeks to provide an improved technique to determine whether a higher spectral density modulation scheme than that being transmitted could have been transmitted error free. This information can be accumulated over time and used as an input to an adaptive modulation process.

Conventional multilevel coding encodes each bit with a code rate appropriate to its significance, so that less significant bits have a more robust coding, so that a vector error can be generated to assist decoding of the more significant bits. This results in a multiplicity of coding and decoding engines, which results in a complex implementation. The presently disclosed system uses a single rate of code applied to the least significant bits and no coding applied to the most significant bits, resulting in a simplification of the implementation. The chosen implementation of multilevel coding is to code the lower two bits equally using a Gray code and sequentially decode using the lower presumed vector to decode the upper bits. By this method, the implementation is simplified with only a small loss in performance compared to conventional multilevel coding and the latency is reduced.

The first step of the decoding method is to pass the digital representation of the input amplitude to a lookup table which is pre-programmed to produce an output representing the likelihood of the two least significant bits being a "1". These likelihood estimates are then passed to the Forward Error Correction decoder, which produces a decision as to the state of the bits taking into account the previous samples also. Once the decision has been made, it is known what the ideal input amplitude would have been in the absence of noise and distortion, on the assumption that the decision was correct, and hence the contribution due to noise and distortion can be estimated. This knowledge can be used to assist the decoding of the most significant bits, which are uncoded, by using the least significant decision to select an appropriately corrected look up table which translates from the input amplitude to the most significant bit decision.

The efficiency of the implementation is further improved since the mechanism to implement the multilevel coding as described above can also be used as a convenient way of providing an input to an adaptive modulation scheme indicating whether or not a potential higher order modulation scheme would have produced errors on the had it been implemented. This is possible, since when operating at less than the maximum spectral efficiency, there will be at least one unused bit per symbol available at the output from the decoder circuit. This bit will have a state that is set according to the combination of the amplitude of the demodulated signal and the decision as to the state of the least significant two bits after error correction. Thus, on the assumption that the error correction process was in fact correct, it is known what the input amplitude should have been in the absence of noise and distortion.

The decision as to the state of the least significant bits determines which one of the four possible points in the input amplitude range constitutes the ideal position. It is possible to define a region above and below the ideal value as an acceptable region, i.e. a region defining the amplitude error that occurred on that bit to be less than some threshold. The threshold may be chosen as that which indicates whether a channel error (before error correction) would have occurred had a more spectrally efficient modulation scheme been used given the estimated amplitude error on that symbol. Alternatively, the threshold may be chosen such that some channel errors are allowed on the two least significant bits of a potential 16 Pulse-Amplitude Modulation (PAM) scheme, since these may be corrected in the decoding process. It is thus possible to construct a look up table, which simply records a pass or fail flag for each possible amplitude state. There will be four versions of the look up table, one for each state of the least significant two bits.

The pass/fail flags can be accumulated over time as an indication of the suitability of the channel for more spectrally efficient modulation.

Figure 7:
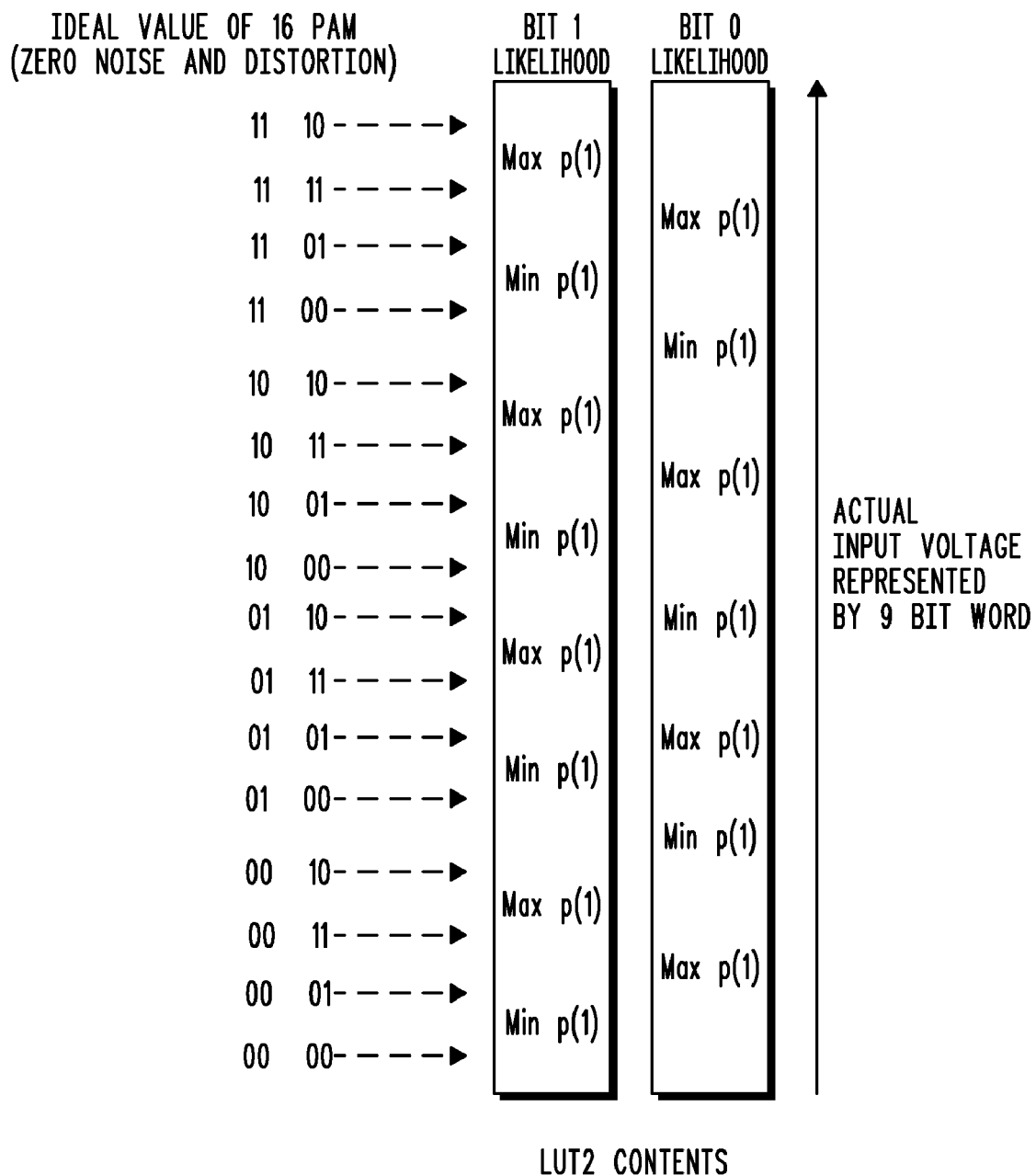
FIG. 7 represents the contents of LUT2 referred to in FIG. 1.
Figure 12:
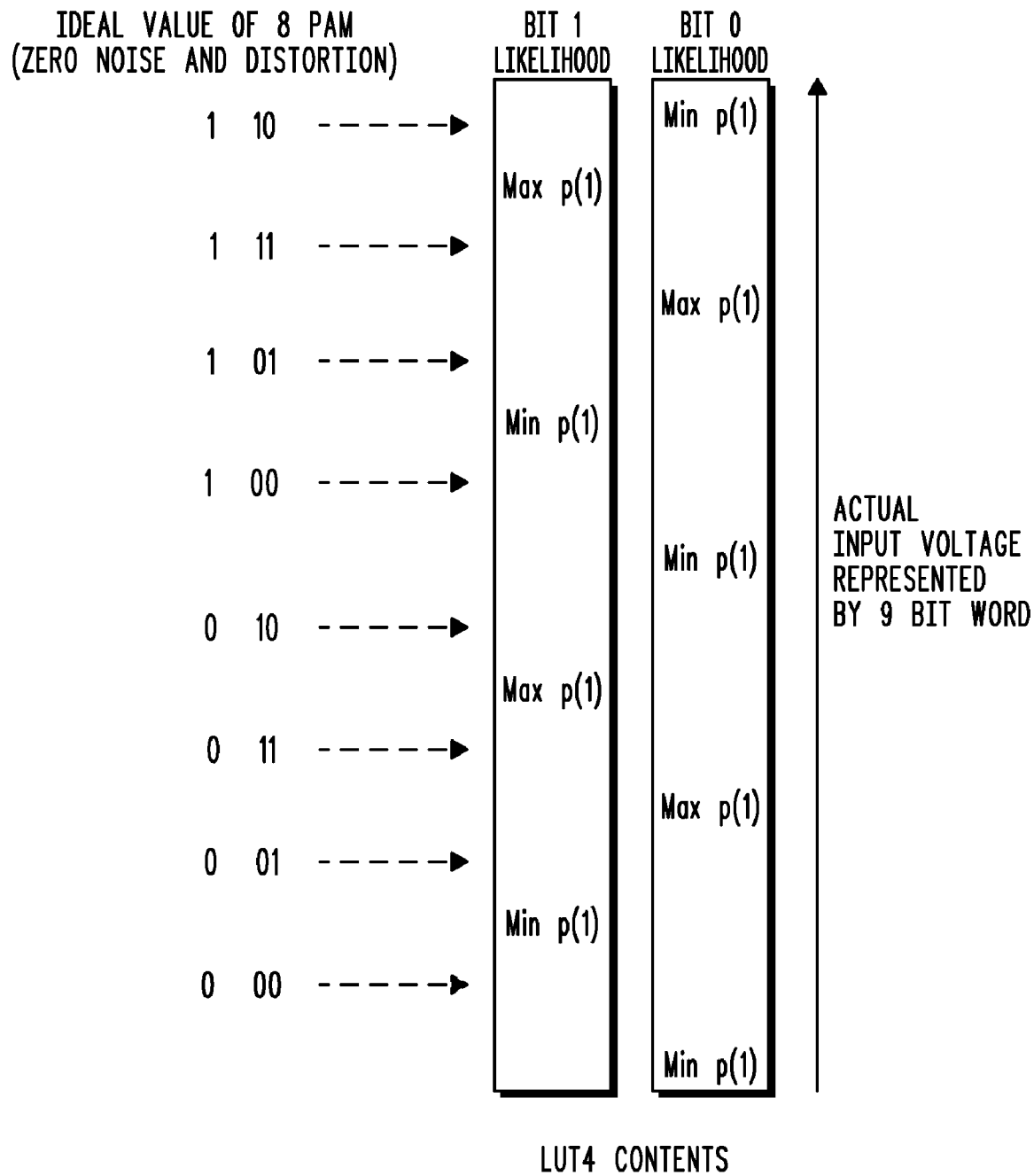
FIG. 12 represents the contents of LUT4 referred to in FIG. 2.

Turning now to the drawings, FIG. 1 shows the implementation of a multilevel decoder 100 configured for 16 PAM mode. The 9 input bits represent either the Inphase or Quadrature component of a given OFDM subcarrier, which is modulated with 256 QAM so that when the inphase and quadrature components are separated each will be modulated with pulse amplitude modulation (16 PAM). The input bits are passed in parallel to two look up tables, LUT1 102 and LUT2 108. LUT2 108 is used to output likelihoods for the values of the least significant two bits coded as a Gray code. The contents of LUT2 108 are shown in FIG. 7. For each value of the 9 bit representation of input voltage, two values are recorded which represent the likelihood of bit 0 and bit 1 being a logical 1. Conveniently, these may be recorded as the logarithm of the ratio given by the probability of a logical 1 divided by the probability of a logical 0. This ratio has the property that it is positive when a 1 is more likely and negative when a 0 is more likely with zero representing an equal likelihood of either. This is a format that is convenient to pass to soft decision FEC decoders. These values are passed to an FEC decoder 110, which gives a decision for the most likely low order bits based on a forward error correction algorithm. The forward error correction method used may be any of the well known soft decision FEC methods: for example convolutional coding with Viterbi decoding.

LUT1 102 produces outputs representing decisions on the most significant two bits in four scenarios corresponding to the four possible least significant bit decisions. These are buffered 104, and when the LS bit decision is available, the appropriate MS bit decision is selected 106 and output. The contents of LUT1 102 are represented in FIGS. 3-6. The principle of operation of the decoding of the most significant bits can be described in the following example.

Referring to FIG. 3, it is known with a high degree of confidence from the error correction process that the least significant two bits have the value 00. Therefore there are four options for the 4 bit PAM value—0000, 0100, 1000 and 1100. Depending on the 9-bit representation of the input voltage, FIG. 3 shows the choice of the appropriate two most significant bits. One of the four possible valid codes is chosen on the basis of the closeness of the ideal voltage for that code to the actual input voltage.

Figure 2:
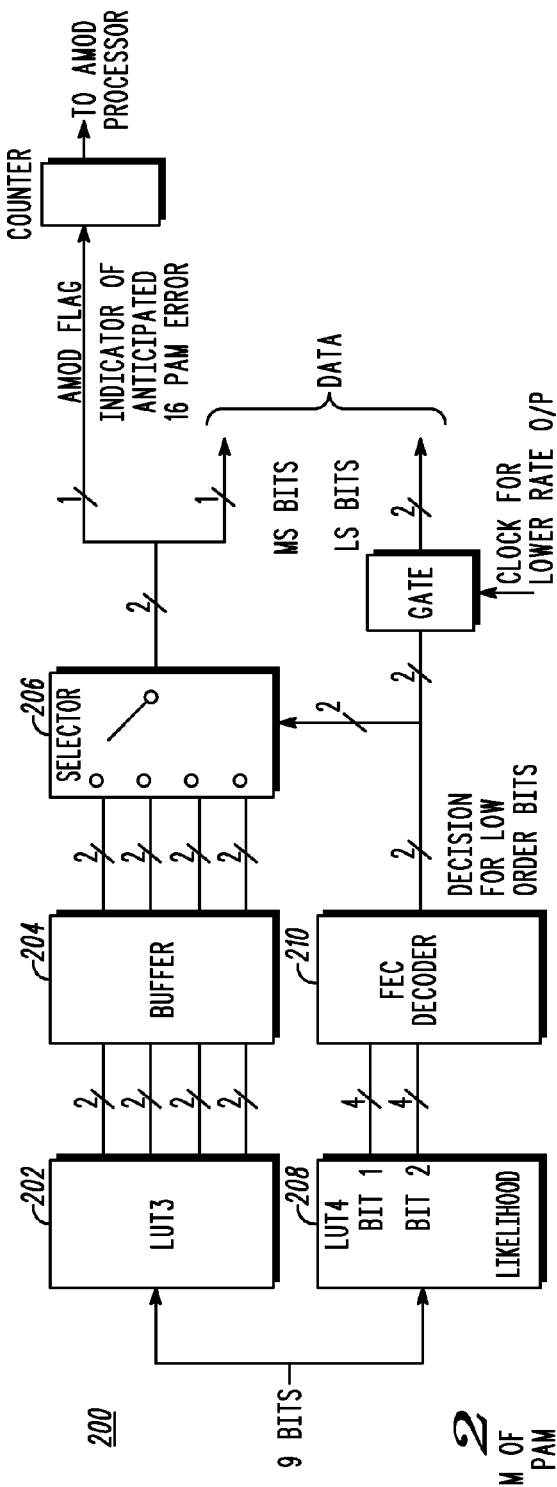
FIG. 2 shows the data flow through the decoder operating in 8 PAM mode incorporating an output to an adaptive modulation processor.

FIG. 2 shows the implementation of a multilevel coder 200 in 8 PAM mode. In this mode, an output to the adaptive modulation system is also provided. The 9 input bits represent either the Inphase or Quadrature component of a given OFDM subcarrier, which is modulated with 64 QAM so that when the inphase and quadrature components are separated each will be modulated with pulse amplitude modulation (8 PAM). The input bits are passed in parallel to two look up tables, LUT3 202 and LUT4 208. LUT4 208 is used to output likelihoods for the values of the least significant two bits coded as a Gray code. The contents of LUT4 208 are shown in FIG. 7. For each value of the 9 bit representation of input voltage, two values are recorded which represent the likelihood of bit 0 and bit 1 being a logical 1. Conveniently, these may be recorded as the logarithm of the ratio given by the probability of a logical 1 divided by the probability of a logical 0. This ratio has the property that it is positive when a 1 is more likely and negative when a 0 is more likely with zero representing an equal likelihood of either. The values are passed to an FEC decoder 210, which gives a decision for the most likely low order bits based on a forward error correction algorithm. The forward error correction method used may be any of the well known soft decision FEC methods: for example convolutional coding with Viterbi decoding.

LUT3 202 produces outputs representing decisions on the most significant two bits in four scenarios corresponding to the four possible least significant bit decisions. These are buffered 204, and when the LS bit decision is available, the appropriate MS bit decision is selected 206 and output. The contents of LUT3 202 are represented in FIGS. 8-11. The principle of operation of the decoding of the most significant bits is as described previously with reference to LUT1. Only one MS bit is output, selected on the basis of the LS bit decision as before, as illustrated by FIGS. 8-11. However, in this case, the implementation provides capacity for an extra bit of information to be contained in the look up table. The bit is used as a flag (AMOD Flag) to indicate whether or not the vector error for reliable operation of 16 PAM had been exceeded for that sample. This information is encoded into the look up table, on the basis of allowable regions of the 9 bit input range given the decision on the LS and MS bits. If the 9 bit input word is within an allowable region, the AMOD Flag is set to value 0 to indicate that a 16 PAM modulation format could have been received with allowable vector error, as illustrated in FIGS. 8-11. The allowable vector error range, shown as d in FIGS. 8-11, can be set to an arbitrary value to give appropriate system margins. For example, some errors on the least significant two bits may be allowed, since error correction coding is employed. The AMOD Flags can be accumulated over multiple samples to give a reliable indication to the adaptive modulation processor. For example, it may be required that 1000 consecutive samples of the AMOD flag all have value 0 before the adaptive modulation processor will allow 16 PAM modulation to be selected, contingent on other factors also.

Where the modulation type is the same for all subcarriers making up the OFDM symbol, the worst case subcarrier will be the limiting factor. Where adaptive modulation can allow different types of modulation on each subcarrier, the technique can be used to select the modulation type on a carrier-by-carrier basis.

It will be appreciated by those of ordinary skill in the art that further modifications to and variations of the above-described system and method for implementing a coding and adaptive modulation scheme for application to a point-to-point OFDM radio communications link may be made without departing from the inventive concepts disclosed herein.

What is claimed is:

1. A method of multilevel coding, for use in communicating at least one signal over at least one communications channel, the method comprising the steps of:
   generating a digital representation of a first amplitude of said signal, said digital representation of said first amplitude of said signal including a plurality of least significant bits and a plurality of most significant bits;
   determining at least one likelihood estimate of at least two of said plurality of least significant bits being a predetermined logical level;
   decoding said at least one likelihood estimate to determine a state of said at least two least significant bits; and
   determining the plurality of most significant bits using the state of the at least two least significant bits and the first amplitude of said signal.

2. The method of claim 1 wherein the plurality of least significant bits are coded as a Gray code.

3. The method of claim 1 wherein determining at least one likelihood estimate comprises passing the digital representation of the first amplitude to a look up table to determine the at least one likelihood estimate of at least two of said plurality of least significant bits being a predetermined logical level.

4. The method of claim 3 wherein two of said plurality of least significant bits are bit 0 and bit 1 and the at least one likelihood estimate represents a likelihood of bit 0 and bit 1 being a logical 1.

5. The method of claim 4 wherein the likelihood estimate is represented by a logarithm of a ratio of a probability of a logical 1 divided by a probability of a logical 0.

6. The method of claim 3 wherein determining the plurality of most significant bits comprises using the at least two least significant bits and the first amplitude of said signal as indices into a look up table containing the plurality of most significant bits for each amplitude two least significant bits combination.

7. A method of multilevel coding, for use in communicating at least one signal over at least one communications channel, the method comprising the steps of:
   generating a digital representation of a first amplitude of said signal, said digital representation of said first amplitude of said signal including a plurality of least significant bits and a plurality of most significant bits;
   determining at least one likelihood estimate of at least two of said plurality of least significant bits being a predetermined logical level;
   decoding said at least one likelihood estimate to determine a state of said at least two least significant bits;
   determining one of the plurality of most significant bits using the at least two least significant bits and the first amplitude of said signal; and
   determining whether a pulse amplitude modulation mode can be changed.

8. The method of claim 7 wherein determining whether a pulse amplitude modulation can be changed comprises:
   determining whether a flag is set, the flag being set indicating that a vector error for reliable operation in a different pulse amplitude modulation mode has been exceeded; and
   when the flag is not set for a predetermined amount of samples of the input signal, determining that the pulse amplitude modulation mode can be changed.

* * * * *